United States Patent
Kim et al.

(10) Patent No.: US 9,374,573 B2
(45) Date of Patent: Jun. 21, 2016

(54) THREE-DIMENSIONAL IMAGE DISPLAY DEVICE

(71) Applicant: LG Electronics Inc., Seoul (KR)

(72) Inventors: Wootae Kim, Seoul (KR); Jinbeom Kim, Seoul (KR); Taesoo Park, Seoul (KR); Dongwook Kim, Seoul (KR)

(73) Assignee: LG Electronic Inc., Seoul (KR)

( * ) Notice: Subject to any disclaimer, the term of this patent is extended or adjusted under 35 U.S.C. 154(b) by 324 days.

(21) Appl. No.: 13/889,487

(22) Filed: May 8, 2013

(65) Prior Publication Data

US 2013/0307947 A1  Nov. 21, 2013

(30) Foreign Application Priority Data

May 21, 2012 (KR) .................. 10-2012-0053473

(51) Int. Cl.
*H04N 13/04* (2006.01)
*G02B 27/22* (2006.01)
*G02B 27/00* (2006.01)

(52) U.S. Cl.
CPC ........ *H04N 13/0402* (2013.01); *G02B 27/2214* (2013.01); *H04N 13/0409* (2013.01); *H04N 13/0411* (2013.01); *H04N 13/0468* (2013.01); *G02B 27/0093* (2013.01)

(58) Field of Classification Search
CPC ........... H04N 13/0402; H04N 13/0411; G02B 27/2214; G02B 27/0093
See application file for complete search history.

(56) References Cited

U.S. PATENT DOCUMENTS

| | | | |
|---|---|---|---|
| 5,771,066 A | 6/1998 | Barnea | 348/59 |
| 6,304,286 B1 | 10/2001 | Shirai et al. | 348/51 |
| 7,190,518 B1 | 3/2007 | Kleinberger et al. | 359/465 |
| 2002/0021492 A1* | 2/2002 | Morishima | G02B 27/2214 359/463 |
| 2004/0169920 A1* | 9/2004 | Uehara | G02B 27/2214 359/443 |
| 2006/0279567 A1* | 12/2006 | Schwerdtner | H04N 13/0418 345/419 |
| 2007/0058127 A1* | 3/2007 | Mather | G02B 27/2214 349/159 |
| 2007/0132905 A1* | 6/2007 | Kim | G02F 1/133308 349/58 |
| 2010/0123952 A1 | 5/2010 | Chen et al. | 359/464 |

(Continued)

FOREIGN PATENT DOCUMENTS

CN  1748173 A  3/2006
CN  102053422 A  5/2011

(Continued)

OTHER PUBLICATIONS

Chinese Office Action dated Nov. 24, 2014 issued in application No. 201310188640.5. (with English Translation).

*Primary Examiner* — Jefferey Harold
*Assistant Examiner* — Humam Satti
(74) *Attorney, Agent, or Firm* — Ked & Associates LLP

(57) ABSTRACT

Disclosed is a three-dimensional image display device, in particular, a three-dimensional image display device using a glassless mode. The three-dimensional image display device includes a data panel for displaying an image including a left eye image and a right eye image, a light supplier disposed at a first side of the data panel, the light supplier locally radiating light to enable a left eye image and a right eye image displayed on the data panel to be seen by a left eye and a right eye of a user, respectively, a lens array including a plurality of lenses disposed at a second side being opposite to the first side of the data panel, the lens array determining a passage such that the image supplied by the light supplier is transferred to the user, and a gap layer disposed between the data panel and the light supplier.

19 Claims, 8 Drawing Sheets

(56) References Cited

U.S. PATENT DOCUMENTS

| | | | |
|---|---|---|---|
| 2011/0227898 A1* | 9/2011 | Whitehead | G02F 1/133603 345/211 |
| 2012/0044330 A1* | 2/2012 | Watanabe | G02B 27/2214 348/54 |
| 2012/0057229 A1 | 3/2012 | Kikuchi et al. | 359/463 |

FOREIGN PATENT DOCUMENTS

| | | |
|---|---|---|
| EP | 1 394 593 A1 | 3/2004 |
| EP | 1 729 164 A1 | 12/2006 |
| EP | 1 742 492 A2 | 1/2007 |
| EP | 1 887 807 A1 | 2/2008 |
| WO | WO 2011/145031 A2 | 11/2011 |

\* cited by examiner

THREE-DIMENSIONAL IMAGE DISPLAY DEVICE

This application claims the benefit of Korean Patent Application No. 10-2012-0053473, filed on May 21, 2012, which is hereby incorporated by reference as if fully set forth herein.

BACKGROUND OF THE DISCLOSURE

1. Field of the Disclosure

The present invention relates to a three-dimensional image display device. More specifically, the present invention relates to a three-dimensional image display device using a glassless mode.

2. Discussion of the Related Art

A three-dimensional image display enables three-dimensional images to be displayed on a two-dimensional flat display and is increasingly utilized in applications including media such as image advertisement and movies.

A display device for displaying three-dimensional images, including a polarizing plate or the like, and a screen specifically manufactured to enable three-dimensional images to be displayed on the display device are required in order to display three-dimensional images.

Polarizing plates, polarizing eyeglasses and the like may be used as the device for displaying three-dimensional images. The screen of the display device on which images are displayed is manufactured so that left eye images and right eye images are separately seen through the screen. Accordingly, a viewer views three-dimensional images by the left eye and the right eye thereof, separately, through the screen and thereby experiences a three-dimensional effect.

SUMMARY OF THE INVENTION

Accordingly, the present invention is directed to a three-dimensional image display device that substantially obviates one or more problems due to limitations and disadvantages of the related art.

It is one object of the present invention to provide a three-dimensional image display device which has a decreased overall thickness and enables an image to be seen by a viewer without distortion.

It is another object of the present invention to provide a three-dimensional image display device to solve intensiveness of specific color in image information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a three-dimensional image display device includes a data panel for displaying an image including a left eye image and a right eye image, a light supplier disposed at a first side of the data panel, the light supplier locally radiating light to enable a left eye image and a right eye image displayed on the data panel to be seen by a left eye and a right eye of a user, respectively, a lens array including a plurality of lenses disposed at a second side being opposite to the first side of the data panel, the lens array determining a passage such that the image supplied by the light supplier is transferred to the user, and a gap layer disposed between the data panel and the light supplier.

In another aspect of the present invention, a three-dimensional image display device includes a data panel for displaying an image including a left eye image and a right eye image, a light supplier disposed at one side of the data panel, the light supplier locally radiating light to enable a left eye image and a right eye image displayed on the data panel to be seen by a left eye and a right eye of a user, respectively, a lens array including a plurality of lenses disposed at the other side of the data panel, the lens array determining a passage such that the image supplied by the light supplier is transferred to the user, a first adhesive layer between the light supplier and the data panel, a second adhesive layer disposed between the data panel and the lens array, and a gap layer disposed between the first adhesive layer and the light supplier.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
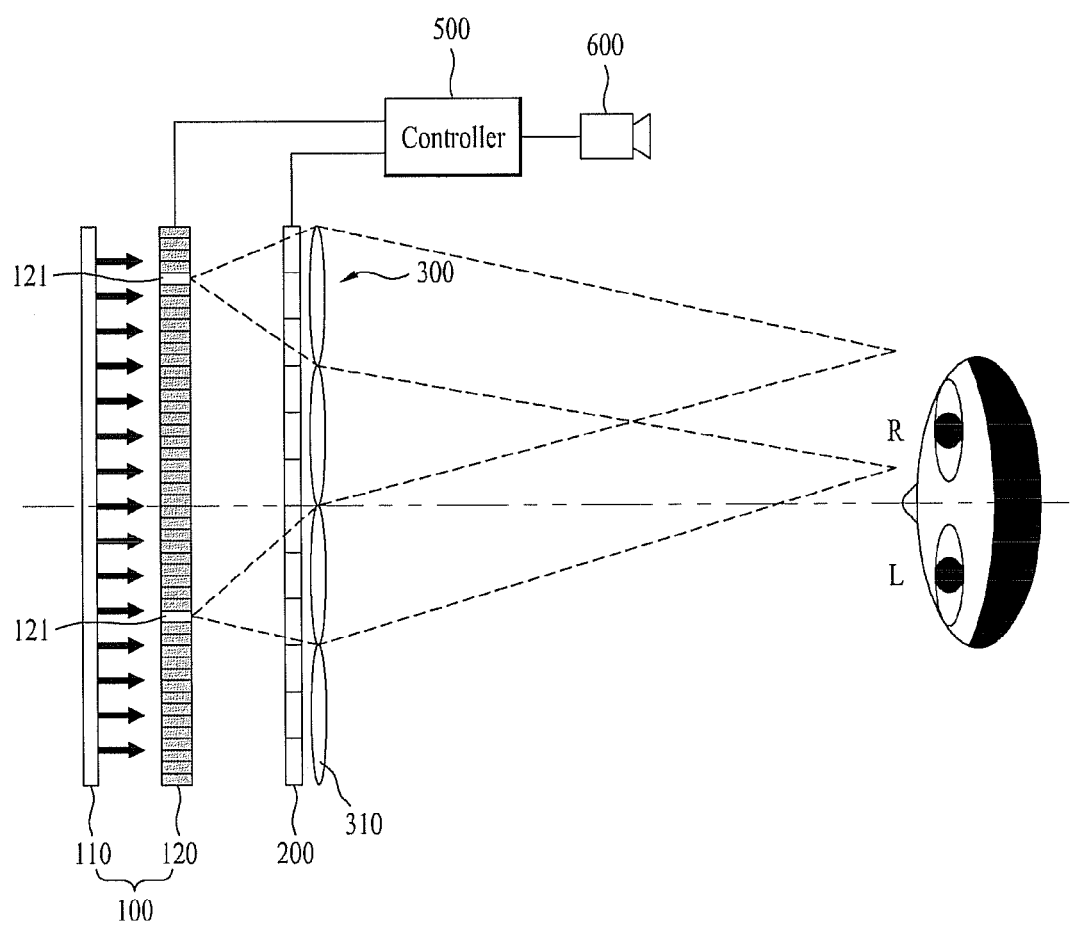
FIG. 1 is a schematic view illustrating a three-dimensional image display device according to one embodiment.

Reference will now be made in detail to the preferred embodiments of the present invention, examples of which are illustrated in the accompanying drawings.

While the invention include various modifications and alternative forms, specific embodiments thereof are shown by way of example in the drawings and will herein be described in detail. It should be understood, however, that there is no intent to limit the invention to the particular forms disclosed. On the contrary, the invention is to cover all modifications, equivalents, and alternatives falling within the spirit and scope of the invention as defined by the claims.

It will be understood that when an element such as a layer, region or substrate is referred to as being "on" another element, it can be directly on the other element or intervening elements may also be present.

It will be understood that, although the terms first, second, etc. may be used herein to describe various elements, components, regions, layers and/or sections, these elements, components, regions, layers and/or sections should not be limited by these terms.

FIG. 1 is a schematic view illustrating a three-dimensional image display device according to one embodiment.

As shown in FIG. 1, the three-dimensional image display device includes a data panel 200 which sequentially displays an image including a left eye image and a right eye image.

In addition, the three-dimensional image display device includes a light supplier 100 which is disposed at a first side of the data panel 200 and locally radiates light to enable a left eye image and a right eye image displayed on the data panel 200 to be seen by the left eye (L) and the right eye (R) of a user, respectively.

As such, the image displayed on the data panel 200 is transferred and seen by the user through the light supplier 100. Such an image is converted into collimated light by a lens array 300 including a plurality of lenses 310 arranged on a plane surface and is transferred to the left eye (L) or the right eye (R) of the user.

The lens array 300 is disposed at a second side of the data panel 200 and the second side is disposed opposite to the first side.

The lenses 310 included in the lens array 300 convert Lambertian light, which is transferred and diffused in all directions from the surface of the light supplier 100, into collimated light to enable the image to be recognized at a position of the user.

In addition, the lens array 300 has a configuration in which the lenses 310 are arranged on the plane surface and one lens is disposed per three sub-pixels or a multiple of 3 sub-pixels of the data panel 200.

As such, the light supplier 100 which supplies light to transfer the image of the data panel 200 to the user includes a backlight 110 and a shutter 120 which selectively and locally supplies light of the backlight 110 to the data panel 200. The shutter 120 may be realized as a liquid crystal panel, but the present is not limited thereto.

The shutter 120 is provided in a matrix form and a specific position of the matrix array is on/off controlled.

For example, when the right eye image is displayed on the data panel 200, the light supplier 100 turns on a first part 121 disposed at a first position enabling the right eye image to be transferred to the right eye (R) of the user.

In addition, when the left eye image is displayed on the data panel 200, the light supplier 100 turns on a second part (not shown) disposed at a second position enabling the right eye image to be transferred to the left eye (L) of the user. The first part 121 may be turned off.

Meanwhile, the three-dimensional image display device may further include a controller 500 for controlling the shutter 120 and the data panel 200, and a sensor 600 for sensing the position of the user.

Accordingly, the controller 500 senses the position of the user through the sensor 600, controls the position of the matrix of the shutter 120, from which light is discharged, and thereby controls tracking operation enabling the image to be transferred to the left or right eye of the user.

In addition, the controller 500 further controls the shutter 120 when the number of the users increases and details of this operation will be described later.

Figure 2:
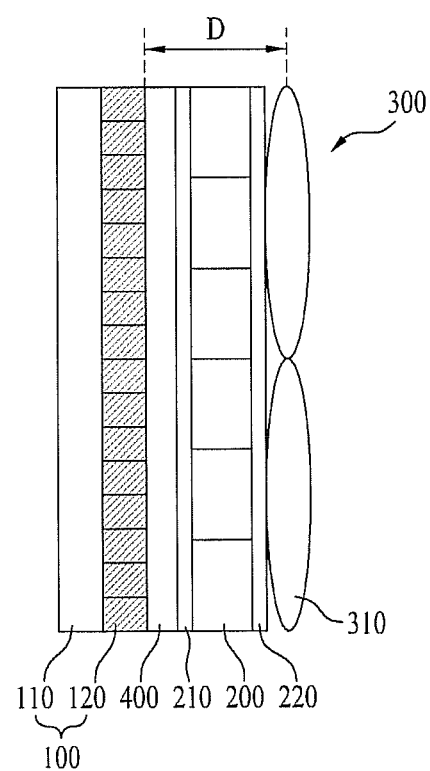
FIG. 2 is a partial enlarged view illustrating the three-dimensional image display device according to one embodiment.

As shown in FIG. 2, a distance D between the light supplier 100 from which Lambertian light is discharged, and the lens array 300 is uniform. The distance D corresponds to a focal distance of the lens 310.

That is, the distance D is set such that light radiated from the light supplier 100 is converted into collimated light via the lens 310.

The distance between the lens array 300 and the light supplier 100 is determined taking this point into consideration. Since the data panel 200 is disposed between the lens array 300 and the light supplier 100, a gap layer 400 is disposed to secure a difference in the distance determined while considering the data panel 200.

That is, the gap layer 400, and a first adhesive layer 210 for bonding the gap layer 400 to the data panel 200 may be disposed between the light supplier 100 and the data panel 200.

The gap layer 400 is disposed between the light supplier 100 and the first adhesive layer 210, and the gap layer 400 is made of a glass or a transparent resin such as a PMMA resin. In addition, the lens array 300 is bonded to the data panel 200 by the second adhesive layer 220.

As such, the gap layer 400 may have a thickness allowing the distance between the light supplier 100 and the lens array 300 to correspond to a focal distance of the lens 310, while taking thicknesses of the data panel 200, the first adhesive layer 210 and the second adhesive layer 220 into consideration.

That is, the thickness of the gap layer 400 is determined to secure a distance enabling light radiated from the light supplier 100 to be converted into collimated light through the lens 310.

The distance D does not necessarily correspond to the focal distance and may be determined within all the distance ranges enabling light radiated from the light supplier 100 to be converted into collimated light by the lens 310. In addition, the thickness of the gap layer 400 may be also determined depending on the distance D.

In the case in which the gap layer 400 is disposed between the light supplier 100 and the lens array 300, the thickness of the gap layer 400 may be greatly decreased, as compared to a case in which the gap layer 400 is not disposed between the light supplier 100 and the lens array 300.

That is, the data panel 200, the first adhesive layer 210 and the second adhesive layer 220 are disposed between the light supplier 100 and the lens array 300, and thicknesses of these components are thus present. Accordingly, the gap layer 400 may have a small thickness due to these thicknesses and an overall thickness of the display device may thus be decreased.

Accordingly, the glass or transparent resin used for the gap layer 400 greatly reduces the overall weight and manufacturing costs of the display device, when considering the weight and costs thereof.

In addition, when the lens array 300 is disposed outside the data panel 200 through the second adhesive layer 220, exterior force is not applied to the lens array 300 during a manufacturing or mounting process, aberrations of the lens 310 are prevented and the lens array 300 can be thus effectively fixed.

As such, images can be transferred to the user without distortion, since aberrations of the lens 310 are not prevented.

Furthermore, the data panel 200 can be stably fixed, since the gap layer 400 and the data panel 200 are bonded to each other through the first adhesive layer 210.

Figure 3:
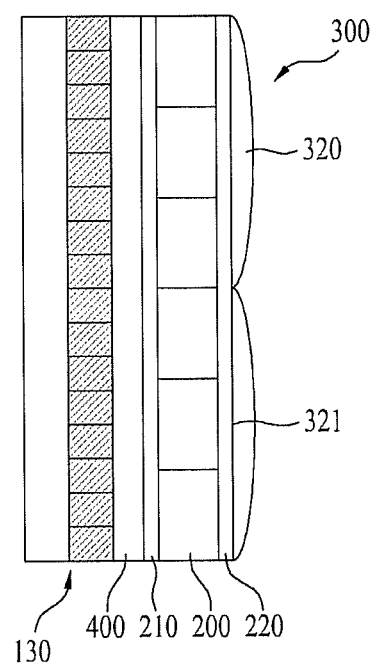
FIG. 3 is a partial enlarged view illustrating the three-dimensional image display device according to another embodiment.

Meanwhile, as shown in FIG. 3, the light supplier 100 may use a self-emitting display 130. That is, the light supplier 100 may be realized as a self-emitting display emitting white light, such as a display using an organic electroluminescent light emitting element or a light emitting display, at a desired position.

In addition, the lens may utilize a lens 320 having a plane surface 320 as a side cross-sectional surface. That is, the lens 320 having a plane surface as a surface 321 adhered to the second adhesive layer 220 may be used. Accordingly, the lens 320 can be further firmly adhered by adhering the second adhesive layer 220 to the plane surface 321. Preferably, other refraction surfaces between the lens 320 and the second adhesive layer 220 are not present.

Figure 4:
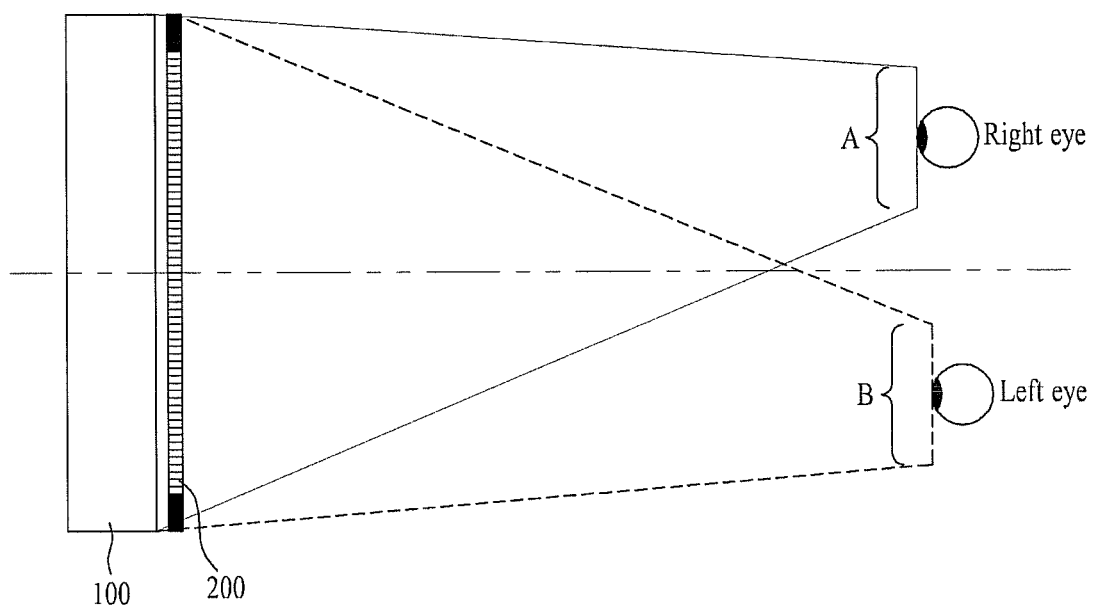
FIG. 4 is a schematic view illustrating an operation of the three-dimensional image display device.

Referring to FIG. 4, realization of three-dimensional images using the three-dimensional image display device will be described below.

The light supplier 100 may be functionally separated from the data panel 200, to enable light to transfer to the left or right eye of the user. Such light reaches as collimated light the left or right eye of the user through the lens array 300. In FIG. 4, the lens array 300 is not shown.

FIG. 4 illustrates a state in which light is transferred to a right eye region A through the light supplier 100 and the lens so that the light reaches the right eye of the user. Referring to FIG. 1, the shutter 120 of the light supplier 100 turns on the first part 121.

As such, when light is transferred to the right eye region A, the right eye image is displayed on the data panel 200.

In addition, when the left eye image is displayed on the data panel 200, the shutter (120, see FIG. 1) of the light supplier 100 turns off the first part 121 and turns on the desired part to transfer light to the left eye region B.

As such, when the right eye image and the left eye image are sequentially displayed on the data panel 200, the light supplier 100 controls the shutter 120 to radiate light to the right eye region A and the left eye region B, so that the right eye image and the left eye image are selectively radiated to the right eye and the left eye of the user, respectively.

Meanwhile, as described above, the sensor 600 senses the position of the user and thereby performs a tracking function.

Figure 5:
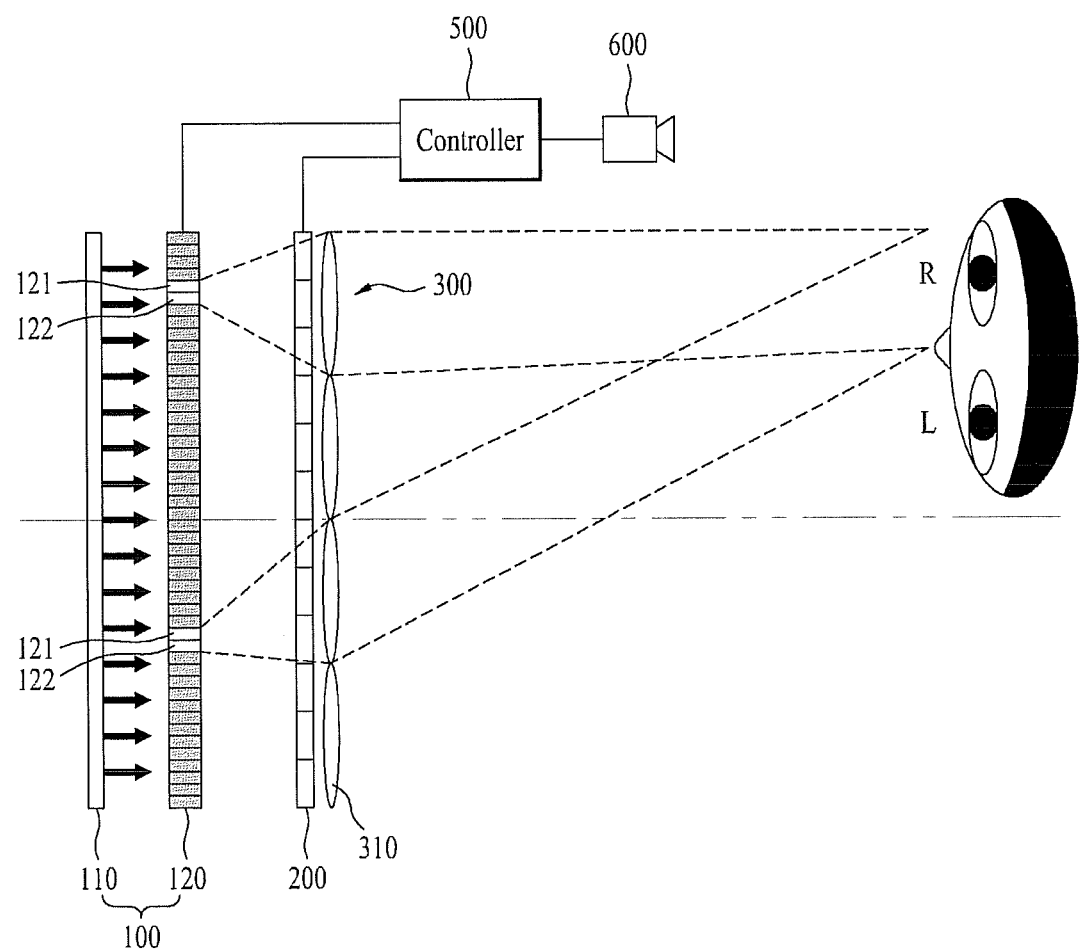
FIG. 5 is a schematic view illustrating one example of a tracking operation of the three-dimensional image display device.

For example, as shown in FIG. 5, when the user who watches the display device moves to one side, the sensor 600 senses this position change of the user, controls light radiation position of the shutter 120 of the light supplier 100 and thereby enables the user to evenly view the three-dimensional image.

That is, when the right eye image is displayed on the data panel 200, in a case in which the user moves from the center to the right side, light radiation position of the shutter 120 is changed from the first part 121 to the second part 122 and tracking is performed so that the same pixel or image is transferred to the right eye (R) of the user.

Accordingly, the first part 121 is turned off. In some cases, both the first part 121 and the second part 122 are turned on.

In this case, when the left eye image is displayed on the data panel 200, light radiation position of the shutter 120 is changed and the same image is transferred to the left eye (L) of the moved user.

Figure 6:
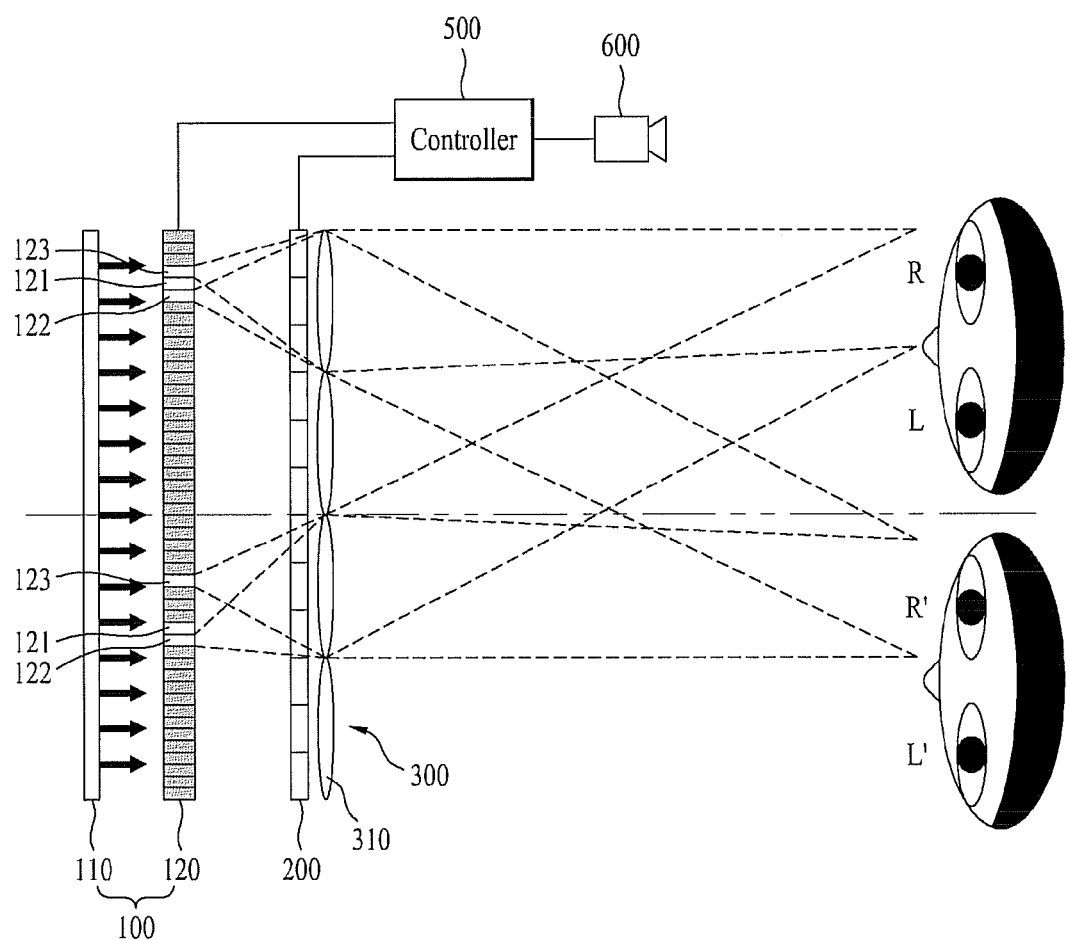
FIG. 6 is a schematic view illustrating another example of a tracking operation of the three-dimensional image display device.

Furthermore, as shown in FIG. 6, when more users are present, that is, a plurality of viewers view a three-dimensional image, the sensor 600 senses the three-dimensional image and the controller 500 controls such that the specific matrix position of the shutter 120 further turns on.

That is, when the right eye image is displayed on the data panel 200, the shutter 120 further turns on a third part 123 to transfer light to the right eye R' of another user and thereby enables the another user to see the same three-dimensional image.

This tracking operation may be also applied to a case in which more users see an image as well as a case in which positions of the users are changed.

Figure 7:
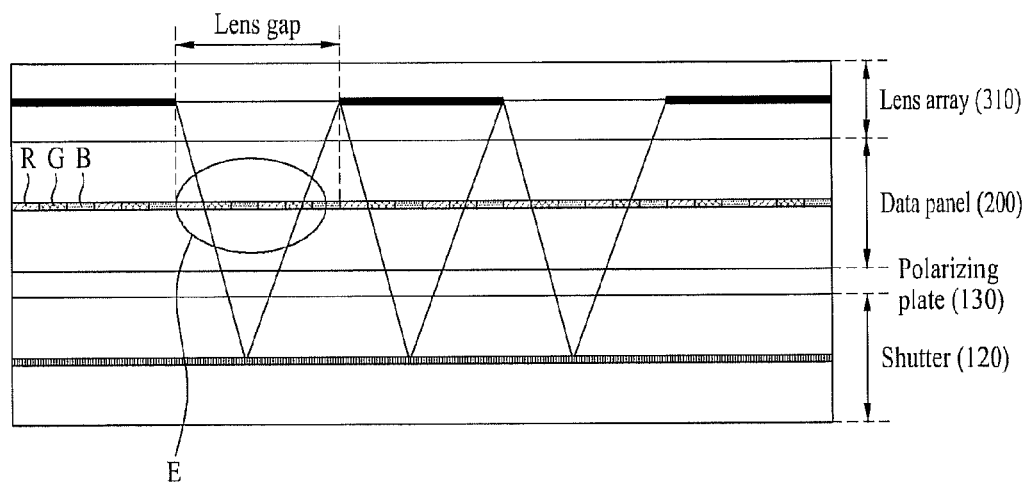
FIG. 7 is a schematic view illustrating a light passage according to one example of pixel arrangement of the three-dimensional image display device.

FIG. 7 schematically illustrates a passage in which light radiated from the shutter 120 passes through the data panel 200 and reaches the lens array 300.

The light passing through the shutter 120 of the light supplier reaches the lens array 300 after passing through the data panel 200. When a display panel such as a general liquid crystal panel is used as the data panel 200, a multiple of 3 of sub-pixels are disposed in each lens gap.

FIG. 7 shows an example in which six sub-pixels including red R, green G and blue B sub-pixels repeated twice in each lens gap are disposed.

In this case, light radiated from the shutter 120 may not reach all the pixels of the data panel 200 and image information loss may thus not be uniform between individual colors.

For example, as shown in FIG. 7, information of green G pixels increases in the region "E". This phenomenon also occurs in other neighboring regions.

Figure 8:
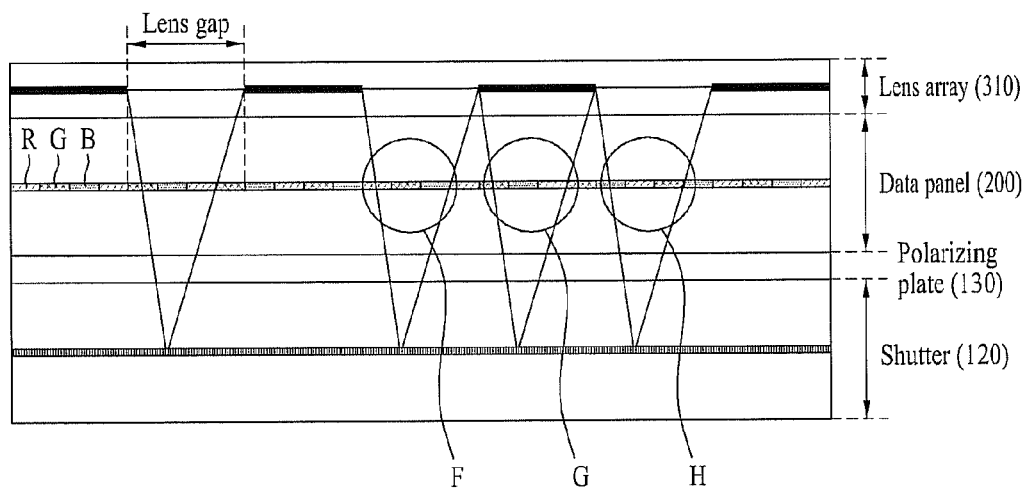
FIG. 8 is a schematic view illustrating a light passage according to another example of pixel arrangement of the three-dimensional image display device.

As shown in FIG. 8, this phenomenon can be solved by disposing 3n+1, in which n represents a natural number, sub-pixels in each lens gap. That is, the number of sub-pixels disposed in each lens gap corresponds to a value obtained by adding one to a multiple of 3.

In FIG. 8, there is image information loss of respective specific colors at positions of "F", "G", and "H", respectively, and the loss of the colors may be entirely balanced.

That is, red R is partially lost at the position of "F", green G is partially lost at the position of "G", and blue B is partially lost at the position of "H". Accordingly, loss of image information is uniform between the colors.

As such, intensiveness of a specific color on realization of three-dimensional images can be solved by disposing sub-pixels of the data panel 200 as described above.

Figure 9:
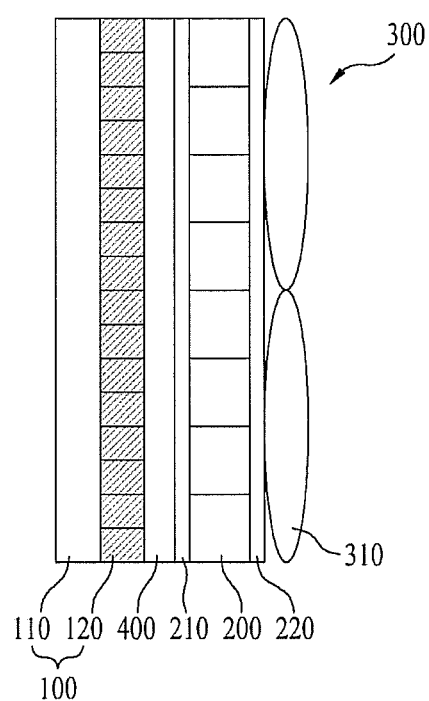
FIG. 9 is a partial enlarged view illustrating the three-dimensional image display device according to the pixel arrangement shown in FIG. 8.

FIG. 9 illustrates an example of a display device having a configuration in which 3n+1 sub-pixels are disposed on the data panel 200.

As described above, four sub-pixels are disposed in each lens 310.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An autostereoscopic three-dimensional image display device comprising:
   a data panel for displaying an image including a left eye image and a right eye image;
   a light supplier disposed at a first side of the data panel, the light supplier locally radiating light to enable a left eye image and a right eye image displayed on the data panel to be seen by a left eye and a right eye of a user, respectively, wherein the light supplier includes a backlight and a shutter selectively transmitting light of the backlight;
   a lens array including a plurality of lenses disposed at a second side being opposite to the first side of the data panel, the lens array determining a passage such that the image supplied by the light supplier is transferred to the user; and a gap layer disposed between the data panel and the light supplier, wherein the gap layer includes a transparent material, and wherein the gap layer has a thickness range that enables light radiated from the light supplier to be converted into collimated light through the lens, wherein the gap layer is disposed between the backlight and the data panel, and wherein the gap layer contacts the shutter.

2. The three-dimensional image display device according to claim 1, wherein the shutter comprises a liquid crystal panel.

3. The three-dimensional image display device according to claim 1, wherein the light supplier comprises a self-emissive display.

4. The three-dimensional image display device according to claim 1, wherein a thickness of the gap layer is determined to correspond to a focal distance from the light supplier to the lens.

5. The three-dimensional image display device according to claim 1, wherein the lens array comprises one lens per 3n+1 (in which n is a natural number) sub-pixels.

6. The three-dimensional image display device according to claim 1, further comprising:
a first adhesive layer disposed between the light supplier and the data panel; and
a second adhesive layer disposed between the data panel and the lens array.

7. The three-dimensional image display device according to claim 1, further comprising:
a sensor for sensing a position of the user; and
a controller for controlling such that light radiation position or direction of the light supplier is changed, based on sensing of the sensor.

8. The three-dimensional image display device according to claim 7, wherein the sensor senses a plurality of users including the user and adds or changes light radiation position of the light supplier according to the increased number of users.

9. The three-dimensional image display device according to claim 1, wherein the gap layer comprises a glass or transparent resin layer.

10. An autostereoscopic three-dimensional image display device comprising:
a data panel for displaying an image including a left eye image and a right eye image;
a light supplier disposed at one side of the data panel, the light supplier locally radiating light to enable a left eye image and a right eye image displayed on the data panel to be seen by a left eye and a right eye of a user, respectively;
a lens array including a plurality of lenses disposed at another side of the data panel, the lens array determining a passage such that the image supplied by the light supplier is transferred to the user;
a first adhesive layer between the light supplier and the data panel;
a second adhesive layer disposed between the data panel and the lens array; and
a gap layer disposed between the first adhesive layer and the light supplier, wherein the gap layer includes a transparent material, and wherein the gap layer has a thickness range that enables light radiated from the light supplier to be converted into collimated light through the lens in combination with thicknesses of the data panel, the first adhesive layer and the second adhesive layer.

11. The three-dimensional image display device according to claim 10, wherein the light supplier comprises:
a backlight; and
a shutter selectively transmitting light of the backlight.

12. The three-dimensional image display device according to claim 11, wherein the shutter is a liquid crystal panel.

13. The three-dimensional image display device according to claim 10, wherein the light supplier is a self-emissive display.

14. The three-dimensional image display device according to claim 10, wherein a thickness of the gap layer is determined to correspond to a focal distance from the light supplier to the lens.

15. The three-dimensional image display device according to claim 10, wherein the lens array comprises one lens per 3n+1 (in which n is a natural number) sub-pixels.

16. The three-dimensional image display device according to claim 10, wherein the adhesive surface of the lens adhered to the second adhesive layer is a plane surface.

17. The three-dimensional image display device according to claim 10, further comprising:
a sensor for sensing a position of the user; and
a controller for controlling such that light radiation position or direction of the light supplier is changed based on the sensing of the sensor.

18. The three-dimensional image display device according to claim 17, wherein the sensor senses a plurality of users including the user and adds or changes light radiation position of the light supplier according to the increased number of Users.

19. The three-dimensional image display device according to claim 10, wherein the gap layer comprises a glass or transparent resin layer.

* * * * *